(12) United States Patent
Ryu

(10) Patent No.: US 7,609,335 B2
(45) Date of Patent: Oct. 27, 2009

(54) BACKLIGHT ASSEMBLY AND LIQUID CRYSTAL DISPLAY HAVING THE SAME

(75) Inventor: Ho-Han Ryu, Suwon-si (KR)

(73) Assignee: Samsung Electronic Co., Ltd., Suwon-Si (KR)

( * ) Notice: Subject to any disclaimer, the term of this patent is extended or adjusted under 35 U.S.C. 154(b) by 0 days.

(21) Appl. No.: 12/043,324

(22) Filed: Mar. 6, 2008

(65) Prior Publication Data

US 2008/0266482 A1    Oct. 30, 2008

(30) Foreign Application Priority Data

Apr. 24, 2007    (KR) .................. 10-2007-0039979

(51) Int. Cl.
*G02F 1/1335*    (2006.01)
*F21V 17/00*    (2006.01)

(52) U.S. Cl. ...................... 349/58; 349/65; 349/70; 362/26; 362/634

(58) Field of Classification Search .............. 349/58, 349/61–62, 65, 70; 362/26, 634
See application file for complete search history.

(56) References Cited

U.S. PATENT DOCUMENTS 6,108,060 A * 8/2000 Funamoto et al. ............. 349/65

FOREIGN PATENT DOCUMENTS

| KR | 2004-0107305 | 12/2004 |
| KR | 2005-0003259 | 1/2005 |
| KR | 2006-0088329 | 8/2006 |

\* cited by examiner

*Primary Examiner*—Frank G Font
*Assistant Examiner*—Michael P Mooney
(74) *Attorney, Agent, or Firm*—F. Chau & Associates, LLC.

(57) ABSTRACT

A backlight assembly and a liquid crystal display having the same which can prevent a lamp wire from being damaged, simplify the manufacturing process, and reduce the manufacturing cost. The backlight assembly includes a receiving container for receiving a lamp, a lamp wire, connected to the lamp, for supplying power to the lamp, and a lamp holder, coupled to the receiving container and connected to the lamp, for guiding the lamp wire in parallel with the lamp.

20 Claims, 11 Drawing Sheets

BACKLIGHT ASSEMBLY AND LIQUID CRYSTAL DISPLAY HAVING THE SAME

CROSS-REFERENCE TO RELATED PATENT APPLICATION

This application claims priority to Korean Patent Application No. 2007-0039979, filed on Apr. 24, 2007, the contents of which are herein incorporated by reference in their entirety.

BACKGROUND OF THE INVENTION

1. Technical Field

The present invention relates to a backlight assembly and a liquid crystal display having the same.

2. Discussion of the Related Art

A liquid crystal display (LCD) is an example of a flat panel display and has, for example, a smaller size, lighter weight, lower power consumption, when compared with a cathode ray tube (CRT). The LCD has been used in the computer industry, the electronic industry, the information communication industry, and the like. The LCD displays a desired image by applying an electric field to a liquid crystal material injected between two substrates, adjusting an intensity of the electric field, and adjusting an amount of light transmitted to the substrate. The liquid crystal material may have an anisotropic dielectric constant.

In order to implement a lightweight, thin, and compact design of the LCD, research is ongoing on elements constituting the LCD, for example, backlights, connectors, printed circuit boards, coupling structures, and the like.

The LCD includes an LCD panel, a backlight assembly for providing light to the LCD panel, and a driving unit for generating various signals required to implement an image in the LCD panel. The backlight assembly may include a lamp and a lamp wire connected to the lamp for applying power to the lamp. The lamp wire may be damaged since the lamp wire is not fixed to a bottom chassis when the LCD is manufactured or marketed.

To conventionally fix the lamp wire, a special tube is mounted to the chassis and tape is attached to the chassis. In addition, a protective cover for protecting the lamp wire may be mounted to the chassis. Since this method requires an increased number of processes, there is the process complexity, the processing time, and the manufacturing cost increase.

SUMMARY OF THE INVENTION

Embodiments of the present invention provide a backlight assembly and a liquid crystal display having the same that can form a lamp holder for positioning a lamp wire in a direction horizontal to a lamp, thereby preventing the lamp wire from being damaged, simplifying the manufacturing process, and reducing the manufacturing cost.

According to an embodiment of the invention, a backlight assembly includes a receiving container; a lamp; a lamp wire connected to the lamp for supplying power to the lamp; and a lamp holder, coupled to the receiving container, fixing an end portion of the lamp and guiding the lamp wire, wherein the lamp holder guides the lamp wire to a first direction substantially parallel with the lamp.

The backlight assembly may further include a connector connecting the lamp wire to a driving unit generating the power.

The lamp holder may comprise a fixing portion fixing the end portion of the lamp, the fixing portion being positioned at an inner side of the receiving container; a direction switching portion positioned at an outer side of the receiving container, wherein the direction switching portion switches the lamp wire from a second direction substantially perpendicular to the lamp to the first direction; and a connection portion connecting the fixing portion and the direction switching portion.

The direction switching portion may comprise an insertion portion into which the lamp wire oriented perpendicular to the lamp is inserted, the insertion portion being formed in an upper surface of the direction switching portion; a guiding portion, formed in a side surface of the direction switching portion, guiding the lamp wire to the first direction; and a connection passage linking the insertion portion and the guiding portion.

The fixing portion may comprise a lamp fixing groove receiving the end portion of the lamp.

The lamp holder may further comprise a joint groove for fixing the lamp holder to the receiving container.

The receiving container may comprise a joint portion positioned in the joint groove.

The lamp holder may be coupled to a lower part of the receiving container.

The lamp holder may be coupled to a side surface of the receiving container.

The backlight assembly may further include a reflective member disposed between the lamp and the receiving container.

According to an embodiment of the invention, a liquid crystal display includes: a liquid crystal display panel; a backlight assembly for supplying light to the liquid crystal display panel, wherein the backlight assembly comprises: a lamp; a optical plate; an optical sheet formed above the optical plate; a receiving container for receiving the lamp, the optical plate, and the optical sheet; a lamp wire connected to the lamp for supplying power to the lamp; and a lamp holder, coupled to the receiving container, fixing an end portion of the lamp and guiding the lamp wire, wherein the lamp holder guides the lamp wire to a first direction substantially parallel with the lamp.

The liquid crystal display may further include a connector connecting the lamp wire to a driving unit generating the power.

The lamp holder may include a fixing portion fixing the end portion of the lamp, the fixing portion being positioned at an inner side of the receiving container; a direction switching portion positioned at an outer side of the receiving container, wherein the direction switching portion switches the lamp wire from a second direction substantially perpendicular to the lamp to the first direction; and a connection portion connecting the fixing portion and the direction switching portion.

The direction switching portion may comprise an insertion portion into which the lamp wire oriented perpendicular to the lamp is inserted, the insertion portion being formed in an upper surface of the direction switching portion; a guiding portion, formed in a side surface of the direction switching portion, guiding the lamp wire to the first direction; and a connection passage linking the insertion portion and the guiding portion.

The fixing portion may comprise a lamp fixing groove receiving the end portion of the lamp.

The lamp holder may further comprise a joint groove for fixing the lamp holder to the receiving container.

The receiving container may comprise a joint portion positioned in the joint groove.

The lamp holder may be coupled to a lower part of the receiving container.

The lamp holder may be coupled to a side surface of the receiving container.

The liquid crystal display may further comprises a reflective member disposed between the lamp and the receiving container.

BRIEF DESCRIPTION OF THE DRAWINGS

Exemplary embodiments of the invention will be more clearly understood from the following detailed description taken in conjunction with the accompanying drawings, in which.

DESCRIPTION OF EXEMPLARY EMBODIMENTS

Figure 1:
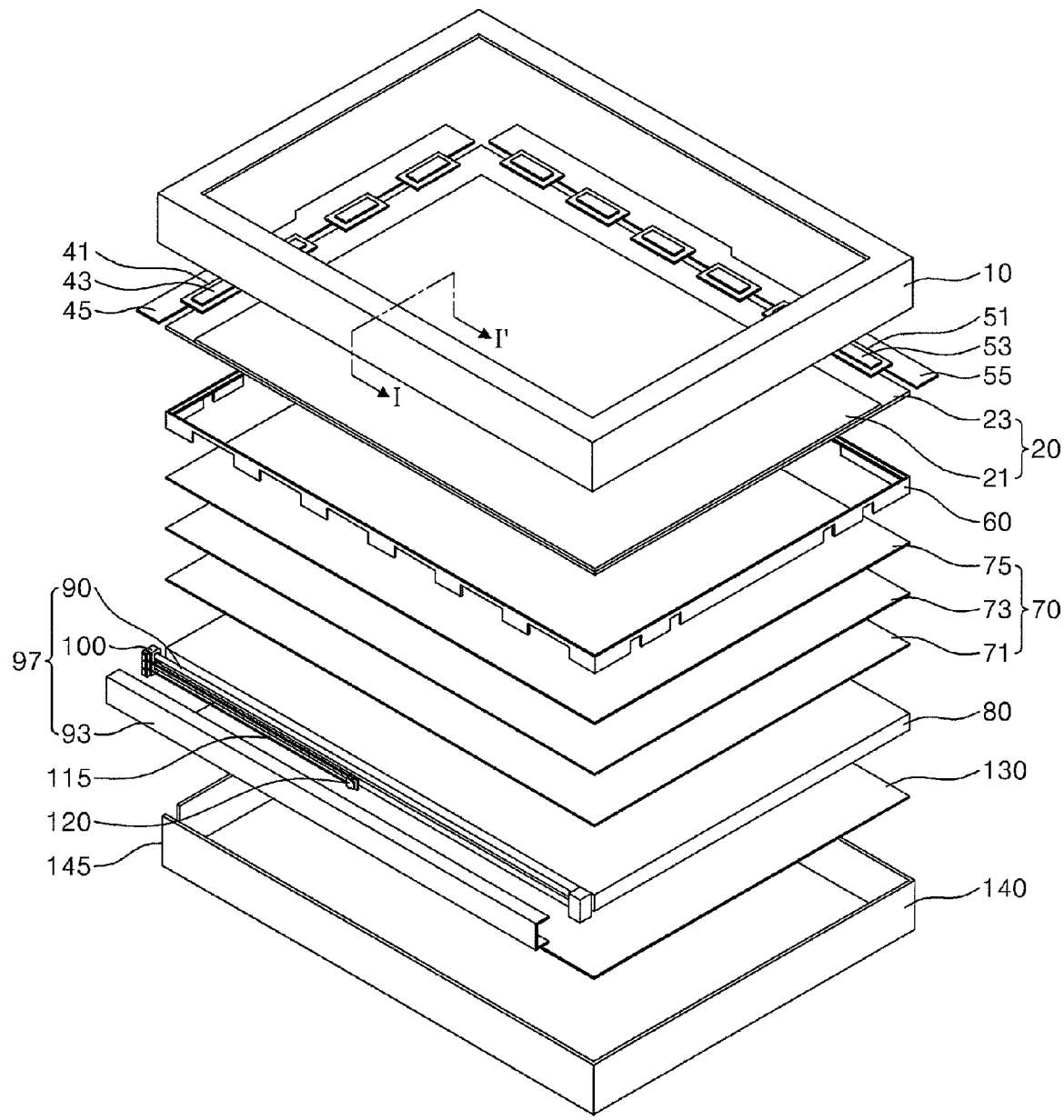
FIG. 1 is an exploded perspective view showing an LCD in accordance with an exemplary embodiment of the invention.
Figure 2:
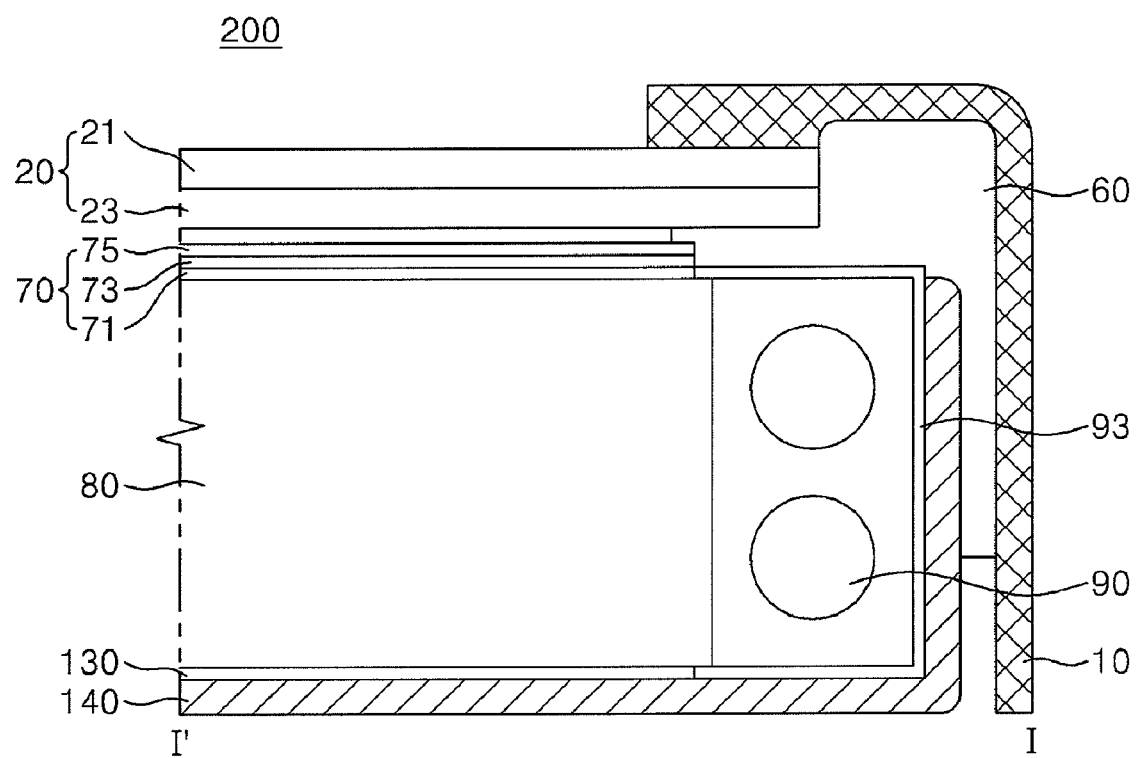
FIG. 2 is a cross-sectional view showing the LCD taken along the line I-I' in FIG. 1.

Hereinafter, exemplary embodiments of the invention will be described with reference to FIGS. 1 to 11B. This invention may, however, be embodied in many different forms and should not be construed as limited to the embodiments set forth herein;

FIG. 1 is an exploded perspective view showing an LCD in accordance with an embodiment of the invention, and FIG. 2 is a cross-sectional view showing the LCD taken along the line I-I' in FIG. 1.

Referring to FIGS. 1 and 2, an LCD 200 includes a top chassis 10, an LCD panel 20, a driving unit, a mold frame 60, a backlight assembly, and a reflective member 130.

The top chassis 10 is arranged at an upper part of the LCD panel 20. The top chassis 10 protects the LCD panel 20 and the backlight assembly from external impacts. The top chassis 10 has an opening at the center of the top chassis 10 such that a display area of the LCD panel 20 can be exposed.

The LCD panel 20 includes a color filter substrate 21, a thin-film transistor (TFT) substrate 23, and a liquid crystal layer between the TFT and color filter substrates 23 and 21.

The color filter substrate 21 includes a black matrix formed on an upper substrate of glass, plastic, or the like to shield light, red, green, and blue (RGB) color filters formed in regions divided by the black matrix to implement colors, a common electrode for applying a common voltage to the liquid crystal, and an upper alignment film located on the common electrode for liquid crystal alignment.

The TFT substrate 23 includes data and gate lines, formed to intersect each other, between which a gate insulating film is interposed on a lower substrate of glass, plastic, or the like, TFTs connected to the data and gate lines, pixel electrodes for applying pixel voltages to the liquid crystal layer, and a lower alignment film coated on the pixel electrode for the liquid crystal alignment. A light polarization plate can be attached to a lower surface of the TFT substrate 23 and an upper surface of the color filter substrate 21.

A light transmission amount is adjusted by rotating the liquid crystal on the basis of a difference between the common voltage from the common electrode of the color filter substrate 21 and the pixel voltage from the pixel electrode of the TFT substrate 23. The liquid crystal is made of a material having dielectric constant anisotropy and refractive index anisotropy.

The driving unit includes a gate driving integrated circuit (IC) 43 for driving gate lines of the LCD panel 20 and a data driving IC 53 for driving data lines of the LCD panel 20. The driving unit includes a timing controller, a power supply, and various circuit elements, and generates various signals required to implement an image. The timing controller, the power supply, and the various circuit elements are attached to printed circuit boards (PCBs) 45 and 55.

Various signal circuits on the gate PCB 45 and the data PCB 55 are connected to the gate and data lines through a gate tape carrier package (TCP) 41 and a data TCP 51.

A mold frame 60 is formed with a mold material. A lower surface of the mold frame 60 supports a reflective member 130, an optical plate 80, a lamp unit 97, and an optical sheet(s) 70, and an upper surface of the mold frame 60 is open to receive the LCD panel 20. Upper/lower/left/right side surfaces of the mold frame 60 can be formed such that a height of the mold frame 60 is less than or equal to that of a structure in which the reflective member 130, the optical plate 80, and the optical sheet(s) 70 are laminated.

The backlight assembly includes the optical plate 80, the optical sheet(s) 70, the lamp unit 97, lamp wires 115, the reflective member 130, and a receiving container.

The optical plate 80 converts line light emitted from the lamp unit 97 into surface light and transfers the converted light to the LCD panel 20. Specifically, the optical plate 80 is used to uniformly transfer light from the lamp unit 97 to a screen display region. The optical plate 80 may include a transparent acrylic material of a thickness of about several millimeters (mm) and a plurality of dots or V-shaped holes (not shown) formed in a lower surface thereof so as to uniformly reflect the light. The optical plate 80 has a size corresponding to that of the LCD panel 20.

The optical sheet(s) 70 causes the light emitted from the optical plate 80 to be incident on the LCD panel 20. For this, the optical sheet(s) 70 includes a diffusion sheet 71 for diffusing light incident from the optical plate 80 and a prism sheet 73 for vertically emitting the light from the diffusion sheet 71.

The lamp unit 97 includes lamps 90, a lamp housing 93, and a lamp holder 100.

The lamps 90 are components for generating the light. The lamps 90 can be formed with a cold cathode fluorescent lamp (CCFL) or external electrode fluorescent lamp (EEFL). One or more lamps 90 can be used according to need. Herein, an example using two lamps 90 will be described. The lamps 90 are formed on a side surface of the optical plate 80. An edge-lighting method is used in which the light emitted from the lamps 90 is incident on the LCD panel 20 through the optical plate 80.

The lamp housing 93 surrounds the lamps 90. The lamp housing 93 is arranged to a side of the optical plate 80 so as to surround the lamps 90 except a portion facing the optical plate 80. The lamp housing 93 is spaced from the lamps 90 at a regular interval. A reflective film is formed on an inner side of the lamp housing 93. The reflective film can be formed by coating a reflective material on the inner side of the lamp housing 93 and can be formed by attaching a sheet having reflective properties. According to an embodiment, the reflective film can be formed by folding one side of the reflective member 130 in a shape of the lamp housing 93.

A lamp holder 100 is equipped with the lamps 90 and fixes the lamps 90 and the lamp wires 115 in parallel with each other.

The lamp wires 115 supply power required to drive the lamps 90 and connect the lamps 90 mounted in the lamp holder 100 with an inverter (not shown) for supplying the power, which is converted to be suitable to drive the lamps 90.

The receiving container is a bottom chassis 140 for protecting the lamp unit 97 and the optical plate 80. The bottom chassis 140, arranged under the optical plate 80, receives the backlight assembly and is surrounds an edge of the backlight assembly. The bottom chassis 140 receives the mold frame 60, which is arranged at a front surface inside the bottom chassis 140, and the LCD panel 20 fitted at an upper end of the mold frame 60. The bottom chassis 140 includes a joint portion 145 formed in a side surface thereof. The inverter for supplying the power to the lamps 90 may be arranged at the side surface of the bottom chassis 140.

The reflective member 130 reduces loss of the light by retro-reflecting the light incident through a rear surface of the optical plate 80 toward the optical plate 80 using a plate of high light reflectance.

Next, a configuration of the lamp holder shown in FIG. 1 will be described in detail.

Figure 3A:
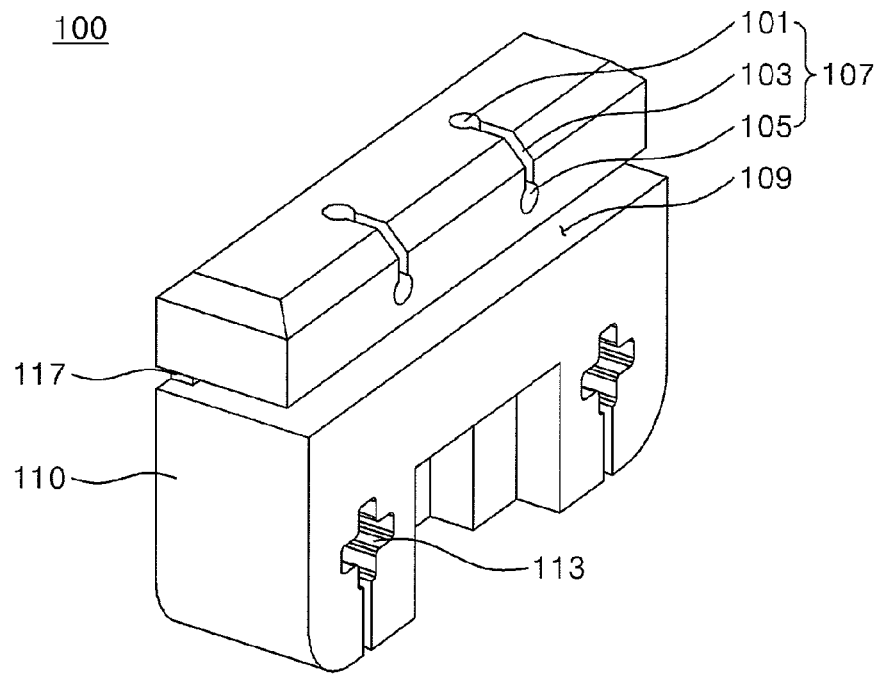
FIGS. 3A and 3B are a perspective view and a front view of a lamp holder shown in FIG. 1.
Figure 3B:
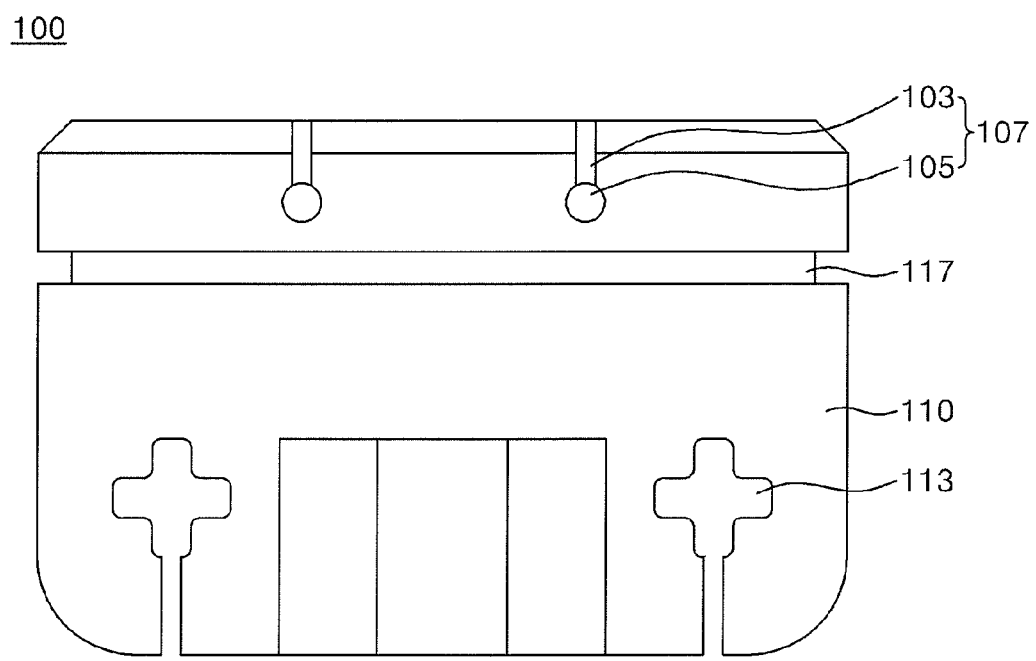

FIGS. 3A and 3B are a perspective view and a front view of the lamp holder shown in FIG. 1.

Referring to FIGS. 3A and 3B, the lamp holder 100 includes a fixing portion 110, a direction switching portion 107, a connection portion 117, and a joint groove 109.

The fixing portion 110 formed at a side of the lamp holder 100 includes a lamp fixing groove 113 in which one side of the lamp is fixed. The lamp fixing groove 113 can have a cross shape of which one branch includes an opening. The opened branch of the cross shape enables the lamp to be inserted into the lamp fixing groove and simultaneously to be fixed by elasticity after insertion. The number of lamp fixing grooves 113 may be equal to that of lamps to be fixed in the fixing portion 110. In this embodiment, the number of lamp fixing grooves 113 is two.

The direction switching portion 107 is formed at the side of the lamp holder 100 opposite the side including the lamp fixing grooves 113. The direction switching portion 107 includes an insertion portion 101 formed in an upper surface of the direction switching portion 107, into which the lamp wire is inserted, and a guiding portion 105, from which the lamp wire is guided, formed in a side surface of the direction switching portion 107. The direction switching portion 107 includes a connection passage 103 formed between the insertion portion 101 and the guiding portion 105 in order to guide the lamp wire inserted into the insertion portion 101 to the guiding portion 105.

The connection portion 117 placed between the fixing portion 110 and the direction switching portion 107 connects edges of the fixing portion 110 and of the direction switching portion 107 to each other.

The joint groove 109 is formed in a space between the fixing portion 110 and the direction switching portion 107 except a part connected by the connection portion 117.

Figure 4A:
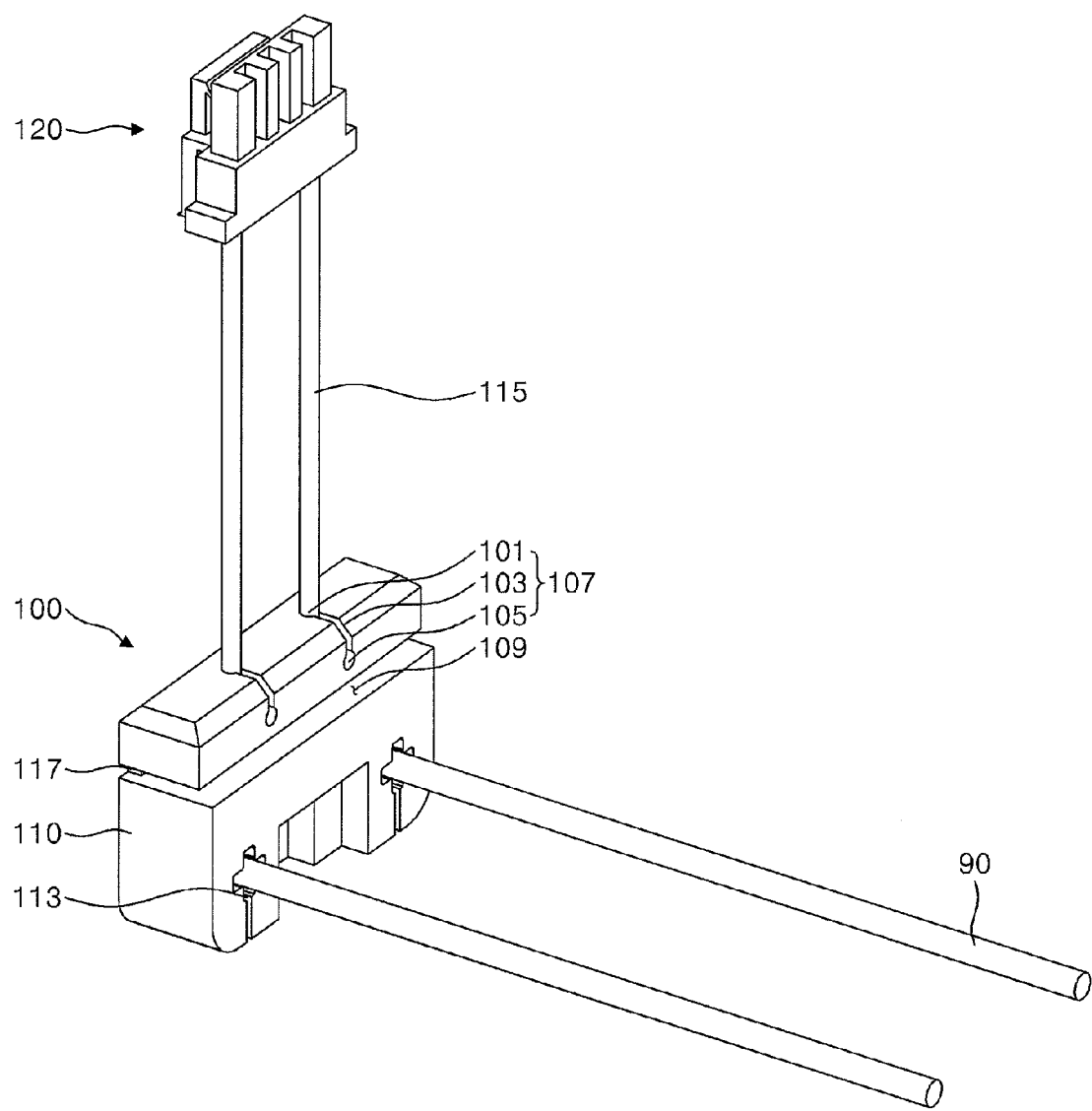
FIGS. 4A, 4B, and 4C are perspective views showing a process in which lamp wires are fixed to the lamp holder.
Figure 4B:
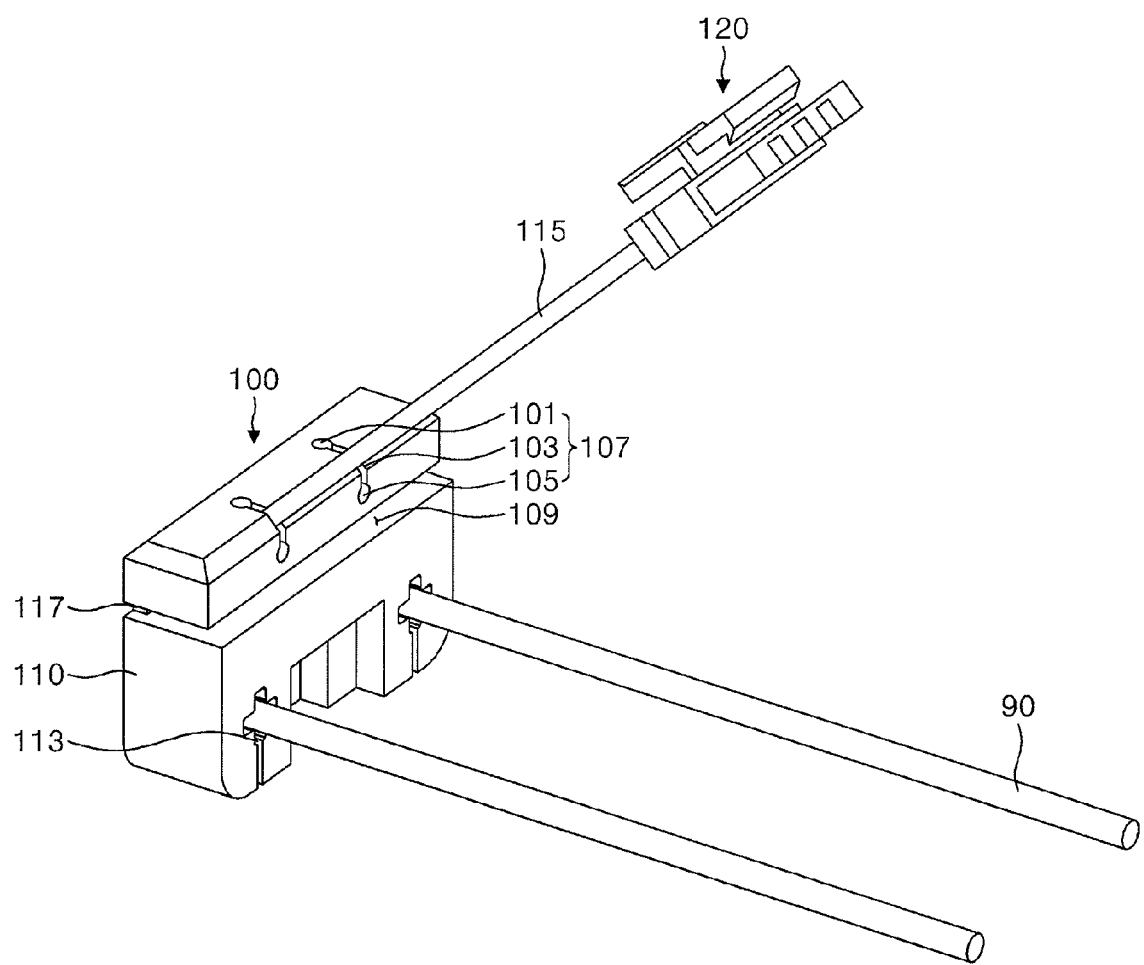
Figure 4C:
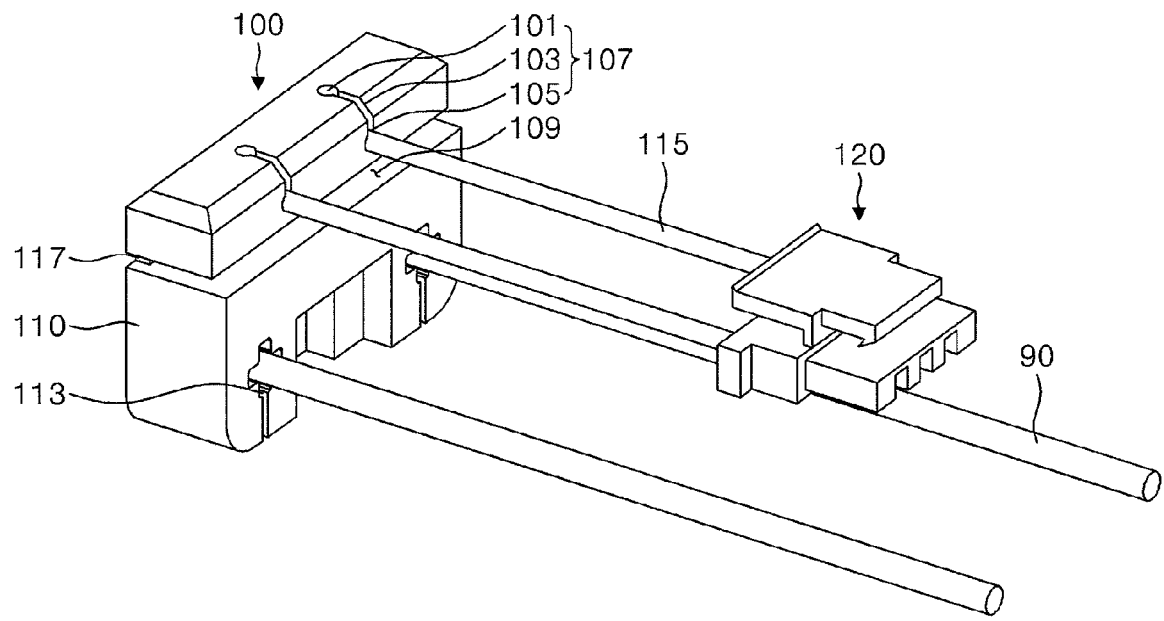

FIGS. 4A, 4B, and 4C are perspective views showing a process in which the lamp wires shown in FIG. 1 are fixed to the lamp holder.

As shown in FIG. 4A, the lamp wires 115, oriented vertically/perpendicular with respect to the lamps 90, are inserted through an insertion portion 101. As shown in FIG. 4B, the lamp wires 115 are moved to the guiding portion 105 through the connection passage 103. As shown in FIG. 4C, the orientation of the lamp wires 115 changed and the lamp wires 115 are guided to the guiding portion 105. The lamp wires 115 are then oriented perpendicularly to the lamp holder 100 and are formed to be parallel to the lamps 90. The lamp wires 115 are fixed to be parallel to the lamps 90, thereby preventing the lamp wires 115 from being damaged by external impacts.

Next, a joint relation of the lamp holder and the receiving container will be described in detail with reference to FIG. 5.

Figure 5:
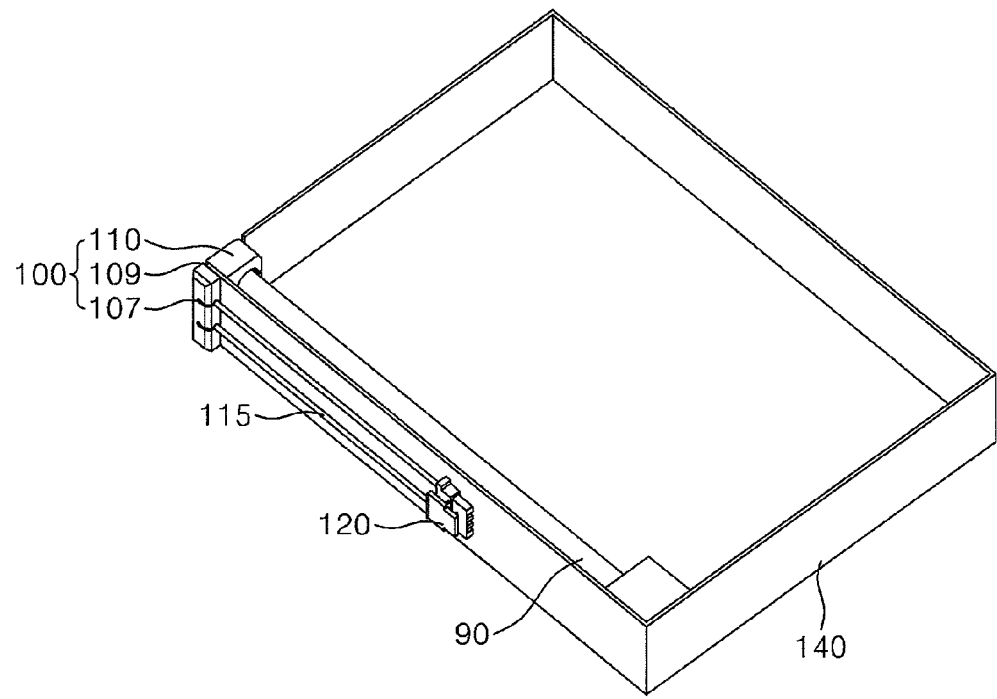
FIG. 5 is a perspective view showing a configuration in which the lamp holder is coupled with a receiving container.

FIG. 5 is a perspective view showing a configuration in which the lamp holder equipped with the lamps shown in FIG. 1 is coupled with the receiving container.

Referring to FIG. 5, the joint groove 109 of the lamp holder 100 is coupled to a joint portion 145 formed at a side surface of the bottom chassis 140, such that the lamp holder 100 can be fixed to the bottom chassis. A space of the joint groove 109, that is, a space between the fixing portion 110 and the direction switching portion 107, may be properly selected by considering the thicknesses of the joint portion 145 and the lamp housing to be inserted into the joint groove 109. When the lamp housing is omitted, the space of the joint groove 109 can correspond more directly to the thickness of the joint portion 145. As the joint groove 109 is coupled to one side surface of the bottom chassis 140, one end surface of the fixing portion 110 of the lamp holder 100 is in close contact with an inner side surface of the bottom chassis 140 and one end surface of the direction switching portion 107 of the lamp holder 100 is fixed in close contact with an outer side surface of the bottom chassis 140.

A connector 120 for connecting to the inverter is formed at the side of the lamp wires 115 opposite to the side of the lamp wires 115 fixed to the lamp holder 100. The connector 120 is fixed to the side surface of the receiving container and is joined with the inverter. Accordingly, since the connector 120 connected to the other side of the lamp wires 115 is joined with the inverter, the lamp wires 115 are maintained in parallel with the lamps 90. Therefore, the lamp wires 115 are fixed to be parallel to the lamps 90, thereby preventing the lamp wires 115 from being damaged by external impacts and implementing the cost-effective fabrication and the simplified manufacturing process without use of a separate tape or protective cover.

Figure 6:
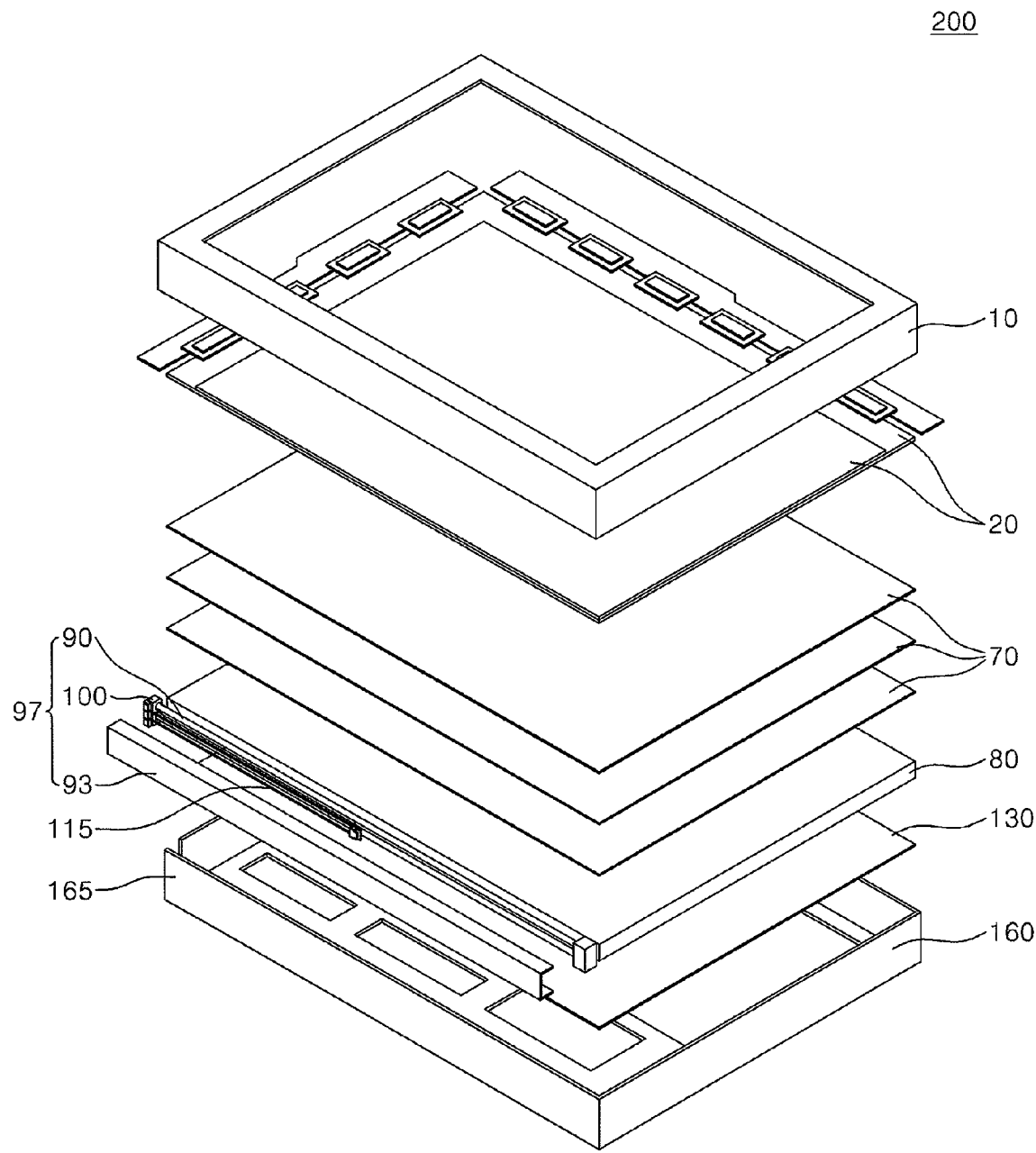
FIG. 6 is an exploded perspective view showing an LCD in accordance with an exemplary embodiment of the invention.

FIG. 6 is a perspective view showing an LCD in accordance with an embodiment of the invention.

Referring to FIG. 6, an LCD 200 includes an LCD panel 20 for displaying an image, a driving unit for driving the LCD panel 20, a backlight assembly for supplying light to the LCD panel 20, and a top chassis 10 for protecting the LCD panel 20 and the backlight assembly.

The LCD panel 20 includes a color filter substrate, a TFT substrate, and a liquid crystal layer to display an image.

The driving unit is formed to drive the LCD panel 20.

The backlight assembly includes a lamp unit 97, an optical plate 80 for transferring light emitted from the lamp unit 97 to the LCD panel 20, and an optical sheet(s) 70 for causing the light emitted from the lamp unit 97 to be incident on the LCD panel 20. The backlight assembly includes a receiving container for receiving the lamp unit 97, the optical plate 80, and the optical sheet(s) 70.

The lamp unit 97 includes lamps 90 for generating the light, a lamp housing 93, and a lamp holder 100 for fixing the lamps 90 and lamp wires 115.

The receiving container is a mold frame 160 for receiving the lamp unit 97, the optical plate 80, and the optical sheet(s) 70. This mold frame 160 is formed with a mold material. A lower surface of the mold frame 160 is formed to be closed so as to support a reflective member 130, the optical plate 80, the lamp unit 97, and the optical sheet 70, and an upper surface of the mold frame 160 is formed to be open so as to receive the LCD panel 20. The mold frame 160 includes a joint portion 165 formed at a side thereof. A joint groove 109 of the lamp holder 100 is coupled to the joint portion 165. Thus, a fixing portion 110 of the lamp holder 100 is coupled to an inner side of the mold frame 160 and a direction switching portion 107 of the lamp holder 100 is coupled to an outer side of the mold frame 160. Therefore, the lamp wires 115 are formed to be parallel to side surfaces of the lamps 90 and the mold frame 160 and are formed to be perpendicular to the lamp holder 100, such that the lamp wires 115 can be protected from external impacts.

The top chassis 10 protects the LCD panel 20 and the backlight assembly from the external impact.

Figure 7:
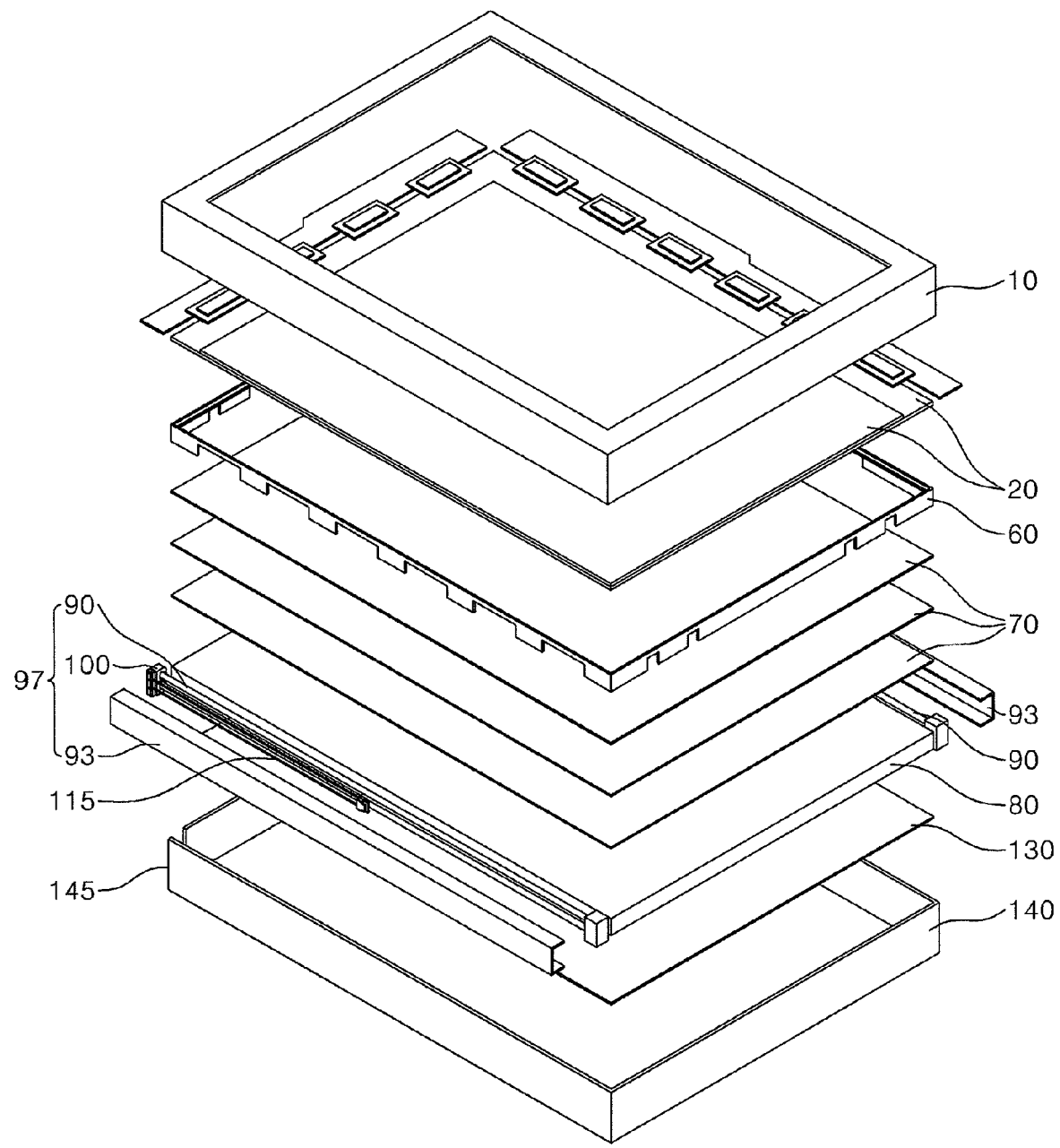
FIG. 7 is an exploded perspective view showing an LCD in accordance with an exemplary embodiment of the invention.

FIG. 7 is a perspective view showing an LCD in accordance with an exemplary embodiment of the invention.

As shown in FIG. 7, an LCD 200 includes an LCD panel 20 for displaying an image, a driving unit for driving the LCD panel 20, a backlight assembly for supplying light to the LCD panel 20, and a top chassis 10 for protecting the LCD panel 20 and the backlight assembly.

The LCD panel 20 includes a color filter substrate, a TFT substrate, and a liquid crystal layer to display an image.

The driving unit is formed to drive the LCD panel 20.

The backlight assembly includes a lamp unit 97, an optical plate 80 for transferring light emitted from the lamp unit 97 to the LCD panel 20, and an optical sheet(s) 70 for causing the light emitted from the lamp unit 97 to be incident on the LCD panel 20. The backlight assembly includes a receiving container for receiving the lamp unit 97, the optical plate 80, and the optical sheet(s) 70.

The lamp unit 97 includes lamps 90 for generating the light, a lamp housing 93, and a lamp holder 100 for fixing the lamps 90 and lamp wires 115.

Figure 8:
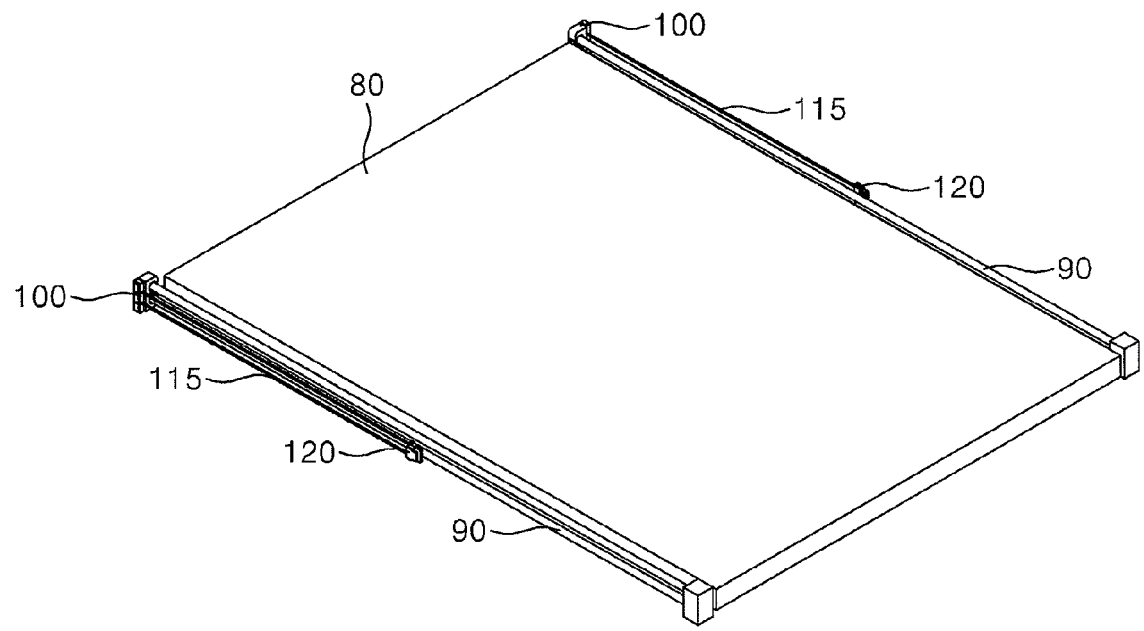
FIG. 8 is a perspective view showing lamps, a lamp holder, and an optical plate shown in FIG. 7.

FIG. 8 is a detailed perspective view showing the lamps, the lamp holder, and the optical plate shown in FIG. 7.

Figure 9:
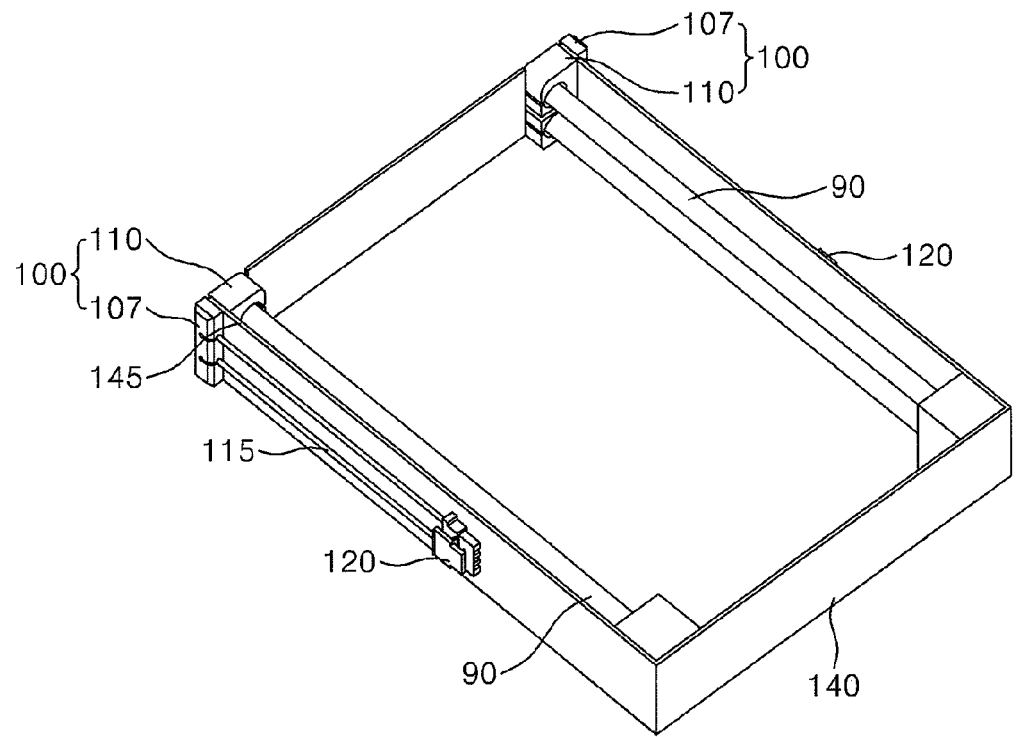
FIG. 9 is a perspective view showing a configuration in which the lamp holder and the lamps shown in FIG. 8 are coupled with a receiving container.

Referring to FIG. 8, the lamps 90 formed at two side surfaces of the optical plate 80 generate light and then supply the generated light to the LCD panel. The lamps 90 are connected to the lamp holders 100. The lamp holders 100 fix the lamps 90 to fixing portions 110. The lamp wires 115 are fixed to direction switching portions 107. Joint grooves 109 of the lamp holders 100 are coupled to joint portions 145 formed on each of two sides of a bottom chassis 140 serving as a receiving container as shown in FIG. 9. Thus, the direction switching portions 107 of the lamp holders 100 are formed at outer sides of the bottom chassis 140, and the fixing portions 110 are formed at inner sides of the bottom chassis 140.

Figure 10:
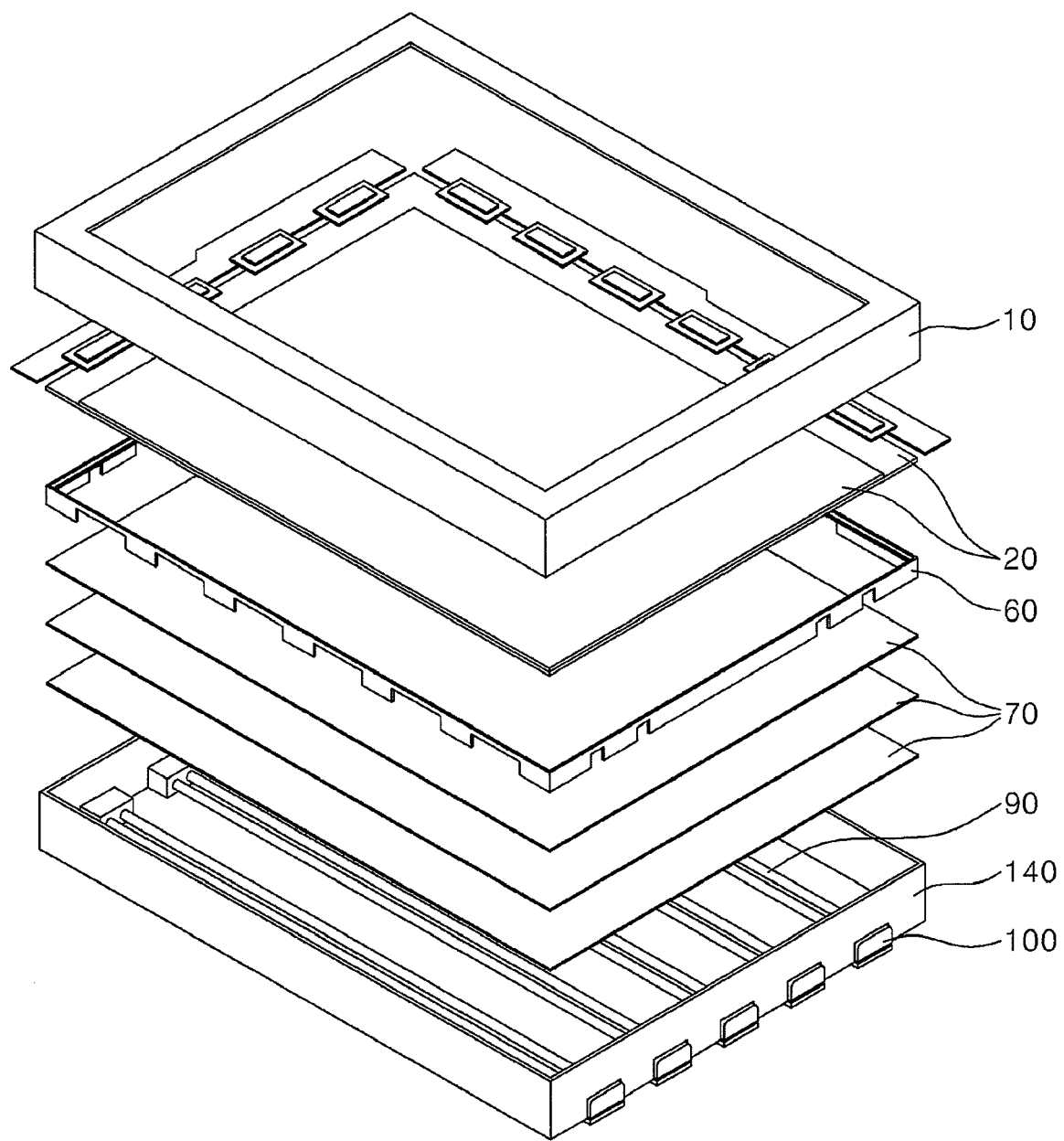
FIG. 10 is an exploded perspective view showing an LCD in accordance with an exemplary embodiment of the invention.

FIG. 10 is a perspective view showing an LCD in accordance with an exemplary embodiment of the invention.

As shown in FIG. 10, an LCD 200 includes an LCD panel 20 for displaying an image, a driving unit for driving the LCD panel 20, a backlight assembly for supplying light to the LCD panel 20, and a top chassis 10 for protecting the LCD panel 20 and the backlight assembly.

The LCD panel 20 includes a color filter substrate, a TFT substrate, and a liquid crystal layer to display an image.

The driving unit is formed to drive the LCD panel 20.

The backlight assembly includes a lamp unit 97, an optical plate 80 for transferring light emitted from the lamp unit 97 to the LCD panel 20, and optical sheet(s) 70 for causing the light emitted from the lamp unit 97 to be incident on the LCD panel 20. The backlight assembly includes a receiving container for receiving the lamp unit 97, the optical plate 80, and the optical sheet(s) 70.

The lamp unit 97 includes a plurality of lamps 90 for generating the light, and lamp holders 100 for fixing the lamps 90 and lamp wires 115.

Figure 11A:
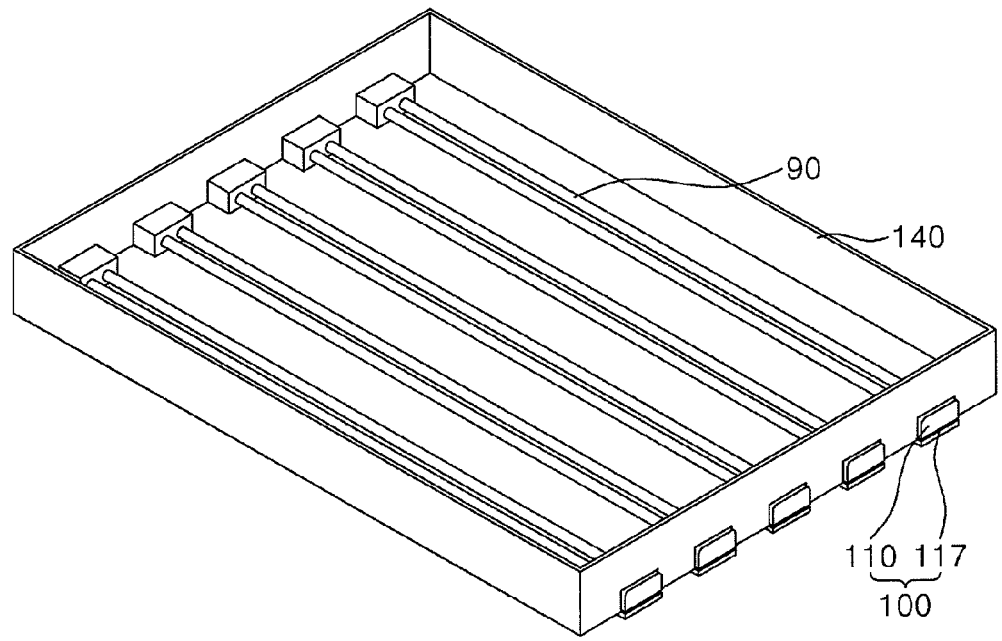
FIGS. 11A and 11B are a plan view and a rear view showing a configuration in which the lamp holder shown in FIG. 10 is coupled with a receiving container.
Figure 11B:
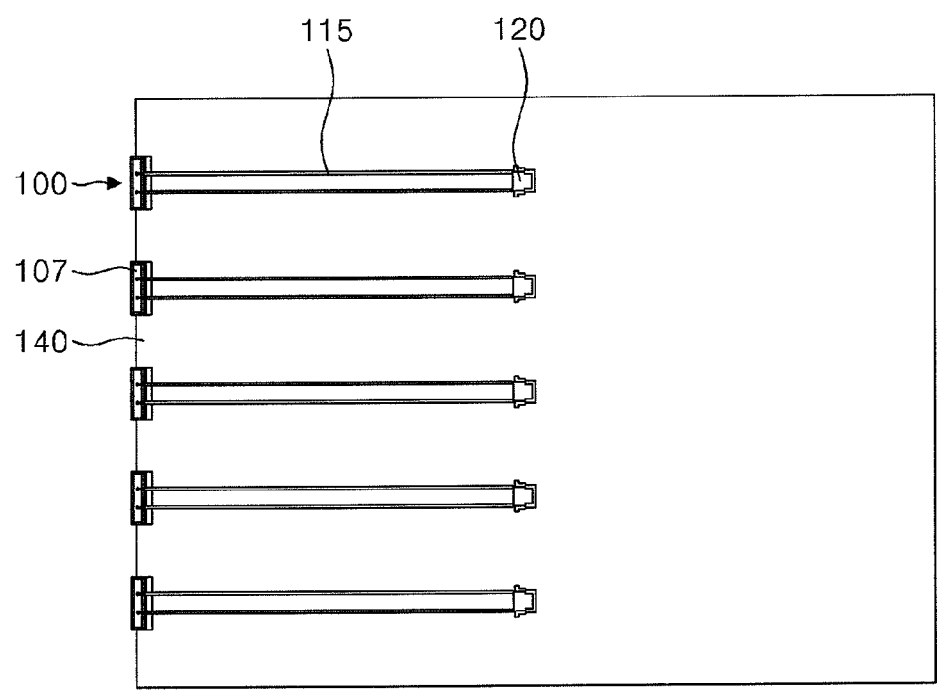

The lamps 90 are formed under the optical sheet(s) 70. The lamps 90 generate the light from a lower part of the optical plate 80 and supply the generated light to the LCD panel 20. Two lamps 90 are fixed to one lamp holder 100. Herein, the lamp holders 100 are coupled to a lower part of a bottom chassis 140 serving as a receiving container as shown in FIG. 11A. Specifically, a lower part of the bottom chassis 140 is coupled to joint grooves 109 of the lamp holders 100. Thus, a fixing portion 110 of each lamp holder 100 is formed at an inner side of a lower surface of the bottom chassis 140. A direction switching portion 107 of each lamp holder 100 is formed at an outer side of the lower surface of the bottom chassis 140 as shown in FIG. 11B. The lamp wires 115 are guided to a guiding portion of the direction switching portion 107. The lamp wires 115 are formed to be parallel to the lamps and to be perpendicular to the lamp holder 100, such that the lamp wires 115 can be protected from external impacts.

A top chassis 10 protects the LCD panel 20 and the backlight assembly from external impacts.

Examples in which the lamp holder 100 is mounted at one side of the lamps 90 have been described. Alternatively, the lamp holder 100 can be mounted at both sides of the lamps 90.

As described above, a backlight assembly and an LCD having the same includes a lamp holder for switching a lamp wire direction. Lamp wires oriented perpendicularly to the lamps are inserted into an insertion portion of a direction switching portion. The lamp wires are moved from the insertion portion to a guiding portion through a connection passage. As a result, the lamp wire direction is switched, and the lamp wires are then fixed to be perpendicular to the lamp holder and to be parallel to the lamps and a surface of the receiving container. Thus, the backlight assembly can be cost-effectively manufactured by a simplified manufacturing process using the lamp holder while preventing the lamp wires from being damaged by external impacts.

While the invention has been shown and described in connection with exemplary embodiments, it will be apparent to those skilled in the art that modifications and variations can be made without departing from the spirit and scope of the invention as defined by the appended claims.

What is claimed is:

1. A backlight assembly comprising:
    a receiving container;
    a lamp placed in the receiving container;
    a lamp wire connected to the lamp for supplying power to the lamp; and
    a lamp holder, coupled to the receiving container, fixing an end portion of the lamp and guiding the lamp wire, wherein the lamp holder guides the lamp wire along an outer side of the receiving container in a first direction substantially parallel with the lamp.

2. The backlight assembly according to claim 1, further comprising:

a connector connecting the lamp wire to a driving unit generating the power.

3. The backlight assembly according to claim 1, wherein the lamp holder comprises:
 a fixing portion fixing the end portion of the lamp, the fixing portion being positioned at an inner side of the receiving container;
 a direction switching portion positioned at an outer side of the receiving container, wherein the direction switching portion switches the lamp wire from a second direction substantially perpendicular to the lamp to the first direction; and
 a connection portion connecting the fixing portion and the direction switching portion.

4. The backlight assembly according to claim 3, wherein the direction switching portion comprises:
 an insertion portion into which the lamp wire oriented perpendicular to the lamp is inserted, the insertion portion being formed in an upper surface of the direction switching portion;
 a guiding portion, formed in a side surface of the direction switching portion, guiding the lamp wire to the first direction; and
 a connection passage linking the insertion portion and the guiding portion.

5. The backlight assembly according to claim 3, wherein the fixing portion comprises a lamp fixing groove receiving the end portion of the lamp.

6. The backlight assembly according to claim 3, wherein the lamp holder further comprises a joint groove for fixing the lamp holder to the receiving container.

7. The backlight assembly according to claim 6, wherein the receiving container comprises a joint portion positioned in the joint groove.

8. The backlight assembly according to claim 7, wherein the lamp holder is coupled to a lower part of the receiving container.

9. The backlight assembly according to claim 7, wherein the lamp holder is coupled to a side surface of the receiving container.

10. The backlight assembly according to claim 2, further comprising:
 a reflective member disposed between the lamp and the receiving container.

11. A liquid crystal display comprising:
 a liquid crystal display panel;
 a backlight assembly for supplying light to the liquid crystal display panel, wherein the backlight assembly comprises:
  a lamp;
  an optical plate;
  an optical sheet formed above the optical plate;
  a receiving container for receiving the lamp, the optical plate, and the optical sheet;
  a lamp wire connected to the lamp for supplying power to the lamp; and
  a lamp holder, coupled to the receiving container, fixing an end portion of the lamp and guiding the lamp wire,
  wherein the lamp holder guides the lamp wire along an outer side of the receiving container in a first direction substantially parallel with the lamp.

12. The liquid crystal display according to claim 11, further comprising:
 a connector connecting the lamp wire to a driving unit generating the power.

13. The liquid crystal display according to claim 11, wherein the lamp holder comprises:
 a fixing portion fixing the end portion of the lamp, the fixing portion being positioned at an inner side of the receiving container;
 a direction switching portion positioned at an outer side of the receiving container,
 wherein the direction switching portion switches the lamp wire from a second direction substantially perpendicular to the lamp to the first direction; and
 a connection portion connecting the fixing portion and the direction switching portion.

14. The liquid crystal display according to claim 13, wherein the direction switching portion comprises:
 an insertion portion into which the lamp wire oriented perpendicular to the lamp is inserted, the insertion portion being formed in an upper surface of the direction switching portion;
 a guiding portion, formed in a side surface of the direction switching portion, guiding the lamp wire to the first direction; and
 a connection passage linking the insertion portion and the guiding portion.

15. The liquid crystal display according to claim 13, wherein the fixing portion comprises a lamp fixing groove receiving the end portion of the lamp.

16. The liquid crystal display according to claim 11, wherein the lamp holder further comprises a joint groove for fixing the lamp holder to the receiving container.

17. The liquid crystal display according to claim 16, wherein the receiving container comprises a joint portion positioned in the joint groove.

18. The liquid crystal display according to claim 17, wherein the lamp holder is coupled to a lower part of the receiving container.

19. The liquid crystal display according to claim 17, wherein the lamp holder is coupled to a side surface of the receiving container.

20. The liquid crystal display according to claim 19, further comprising:
 a reflective member disposed between the lamp and the receiving container.

* * * * *